Feb. 16, 1926.  1,573,576
F. T. ROBERTS ET AL
FOOTBALL AND METHOD OF MAKING THE SAME
Filed April 16, 1923   2 Sheets-Sheet 1

INVENTORS
Fred Thomas Roberts,
William E. Roberts,
By Bates & Macklin
ATTORNEYS

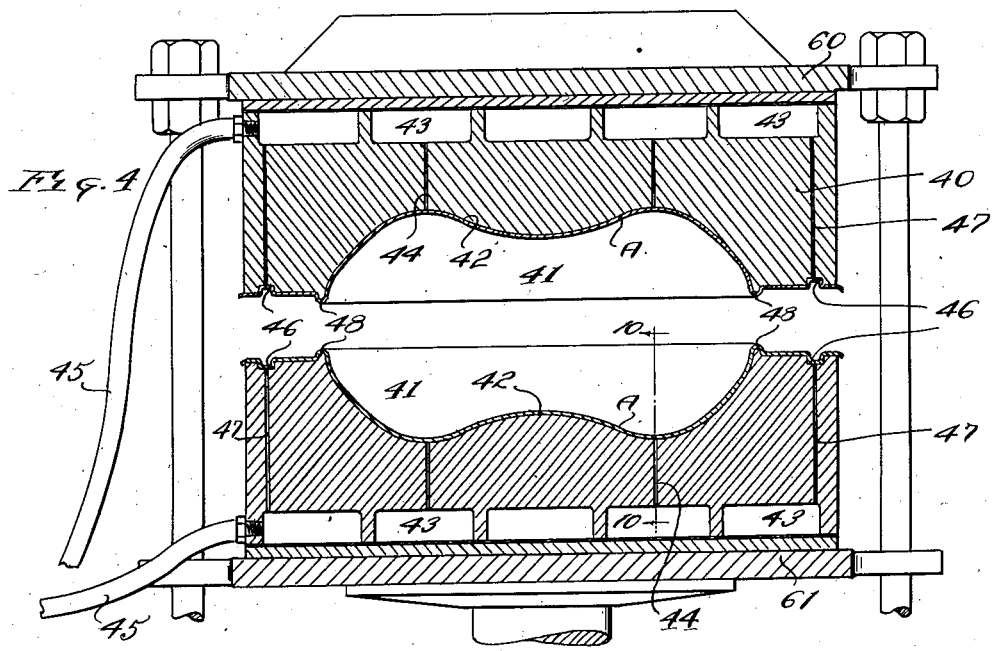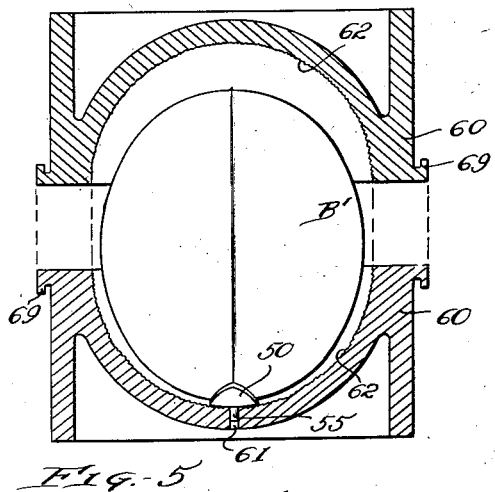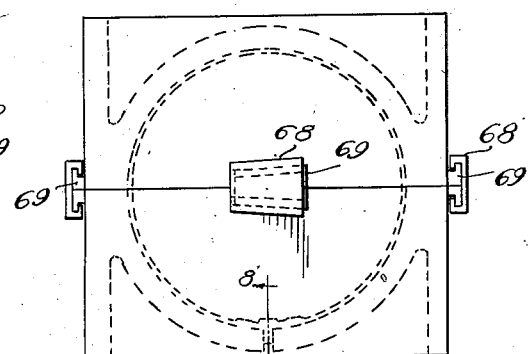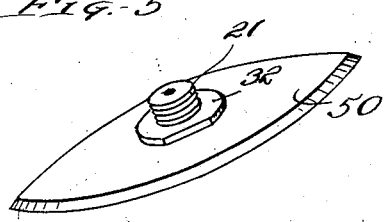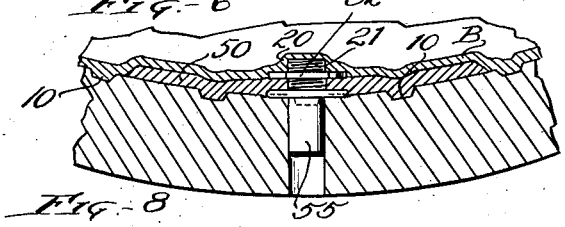

Patented Feb. 16, 1926.

1,573,576

UNITED STATES PATENT OFFICE.

FRED THOMAS ROBERTS, OF UPPER MONTCLAIR, AND WILLIAM EUGENE ROBERTS, OF LITTLE FALLS, NEW JERSEY, ASSIGNORS TO PARAMOUNT RUBBER CONSOLIDATED, INC., OF LITTLE FALLS, NEW JERSEY, A CORPORATION OF DELAWARE.

FOOTBALL AND METHOD OF MAKING THE SAME.

Application filed April 16, 1923. Serial No. 632,228.

*To all whom it may concern:*

Be it known that we, FRED THOMAS ROBERTS and WILLIAM E. ROBERTS, citizens of the United States, residing at Upper Montclair, county of Essex, and State of New Jersey, and Little Falls, county of Passaic, and State of New Jersey, respectively, have invented a certain new and useful Improvement in Footballs and Methods of Making the Same, of which the following is a full, clear, and exact description, reference being had to the accompanying drawings.

The object of this invention is to provide a simple and inexpensive method of making rubber footballs which shall have a tough impervious wall adapted to be readily inflated and to remain inflated notwithstanding rough handling, this single-walled article thus taking the place of the customary leather covered thin rubber bladder.

The invention is concerned with the method of converting a pneumatically seated biscuit into a vulcanized ball, with the method of firmly securing in place the inflating valve, and with the article itself as so produced.

Figure 1:
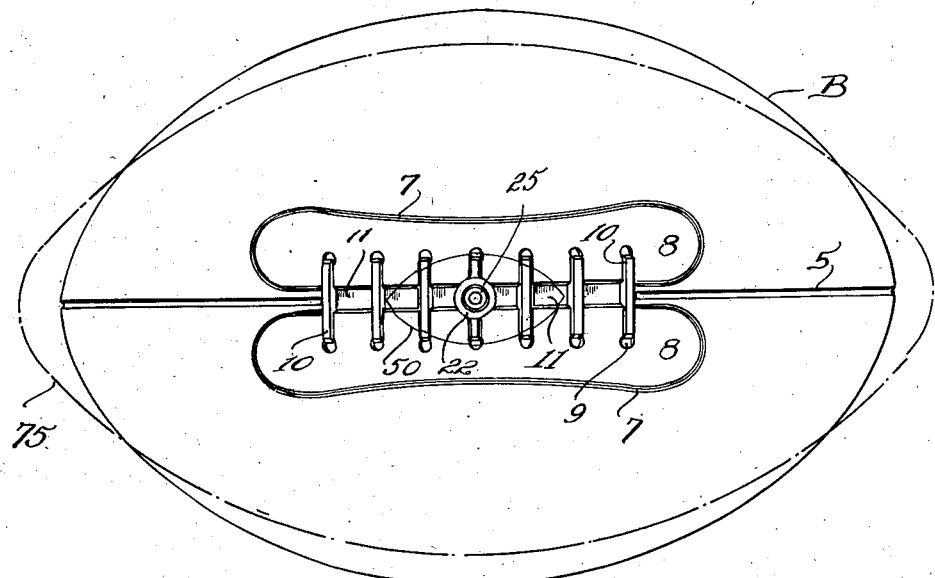
Figure 2:
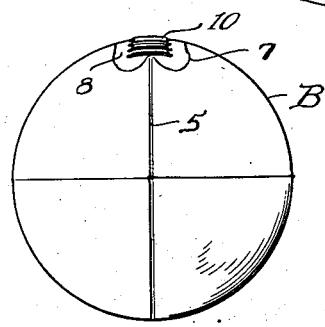
Figure 3:
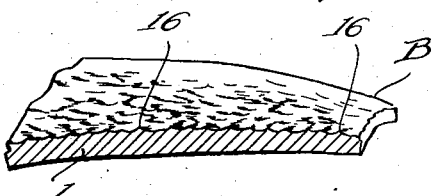
Figure 10:
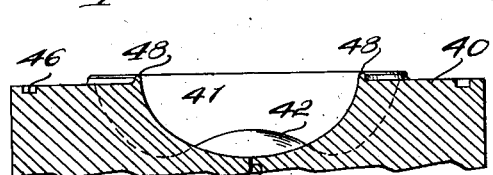
Figure 9:
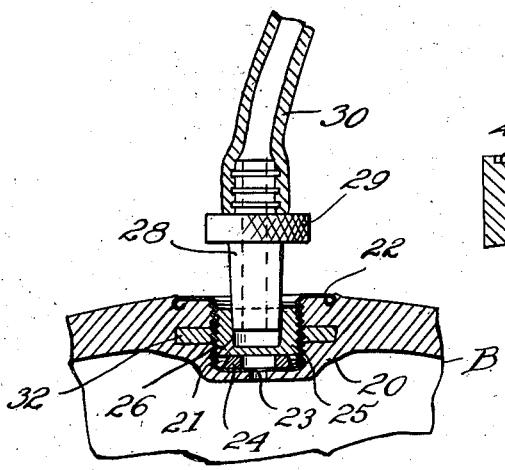

In the drawings, Fig. 1 is a plan view of the completed football inflated; Fig. 2 is an end elevation of the same on a reduced scale; Fig. 3 is a sectional detail illustrating the imitation leather finish which may be produced on the surface by the vulcanizing mold; Fig. 4 is a section through a pair of the forming molds in a press showing the manner of seating sheets of rubber stock in the cavities, the stock being here illustrated as seated and about to be united and severed along the meeting edges of the molds; Fig. 5 is a cross section of a suitable vulcanizing mold; Fig. 6 is an end view of the same; Fig. 7 is a perspective of the valve carrying patch which is vulcanized to the exterior of the said rubber biscuit; Fig. 8 is a section through the valve carrying patch and the adjacent portion of the vulcanizing mold, as indicated by the line 8—8 in Fig. 6; Fig. 9 is an enlarged sectional detail showing the valve mechanism and a method of inflating the ball through it; Fig. 10 is a fragmentary cross section of the forming mold, as indicated by the line 10—10 in Fig. 4.

The football B as shown particularly in Figs. 1 and 2, made in accordance with the present invention, is shown as comprising a single thickness of tough, yet resilient, rubber, the wall being divided into gores by grooves formed in the outer surface, giving the appearance of the usual football, these grooves being designated 5, while at the juncture of two of the apparent gores, the ball is given the appearance of the lacing opening by grooves 7 looped to define the usual leather inserts indicated at 8, there being depressions 9 to indicate the usual openings through which the lacing extends. The lacing is represented by ribs of rubber 10 connecting these openings as shown. A somewhat larger groove 11 represents the space between the two inserts 8, while integral with the wall of rubber is a tubular portion 15 forming a valve opening.

For convenience in illustration, the preferred surface irregularities are not shown in Figs. 1 and 2, but the enlarged view, Fig. 3, is intended to indicate more clearly the actual appearance of the roughened surface upon the wall portion 1 of the ball. This surface in general approximates the appearance of leather and provides the necessary roughness to enable the ball to be readily held even though wet. An effective method of making the vulcanizing mold to give desired rough surface is described and claimed in our companion application No. 632,227 filed April 16th, 1923.

We form the article from sheet rubber by pneumatically seating it in mold cavities which are then brought together to join the portions in an edge seam and to cut off the surplus stock. Broadly, the process employed is that shown, described and claimed in Reissue Patents Nos. 14,603 and 14,604 to F. T. Roberts. The forming mold members and the adjacent portion of a press for operating them are illustrated in Fig. 4.

The forming molds may be cast in any suitable fashion and as shown, consist of body members 40 having mold cavities 41, each corresponding substantially to the shape of one half of the article, or preferably having an inward hump 42 as set out in Reissue No. 14,604. These molds have chambers 43 in their bases which communicate by passageways 44 with the mold cavities. Suitable suction pipes 45 communicating with the chambers enable the air to be exhausted from the cavities to pneumatically seat therein sheet rubber stock A. The molds may be secured against platens 60 and 61 of a suitable press. Around the outside of the mold cavities 41, we have shown grooves 46 from which small passages 47 lead to the vacuum chambers of the molds, so that sheets of rubber stock A, laid across the molds, upon an application of the vacuum are securely held around the outside of the cavities, while vacuum beneath the sheets may draw them into the molds, as shown.

Around the mold cavities are provided the raised cutting edges 48 serving to unite the edges of the stock within the cavities, and sever it from the surrounding sheet after the manner of the process described in the prior patents mentioned.

It will be noted from a comparison of Figs. 4 and 6 that the forming cavity is not only elongated longitudinally to give the ball the plolate form desired but is also elongated laterally; that is to say, the cavity laterally is semi-elliptical, rather than semi-circular, giving the biscuit a flattened ellipsoidal shape with major and minor transverse diameters. The purpose of this flattening will be hereinafter explained.

As a suitable valve, we have chosen a construction illustrated in Fig. 9, where imbedded within the wall B is a thin threaded ferrule 21, having a flange as indicated at 22, flush with the exterior of the rubber and having an inner end wall provided with an opening 23 registering with an opening in the rubber 20. Within the ferrule is a rubber gasket 24 against which may be seated a hollow plug 25 having an opening 26 closed from the interior of the football by a gasket 24 when in the position shown in Fig. 9. As the plug 25 is screwed outwardly slightly, it will be seen that air may pass through the opening 26 through the gasket 24 and opening 23. A threaded washer 32 embracing a ferrule 21 facilitates the implacement of this ferrule and assures it being firmly secured in the rubber 20.

In securing such a valve as described within the rubber wall of the football and at the same time reinforcing the rubber about the valve, we proceed as follows:

We take a raw rubber patch, preferably of lenticular shape, of sheet rubber as indicated at 50 in Fig. 7. We make a central hole through this, and through this hole pass the threaded body portion 21 of the valve ferrule. We then screw down onto the projecting body portion the nut 32. Due to the humps in the forming mold and the fact that the cavity thereof is transversely elliptical rather than circular the biscuit formed, indicated at B¹ in Fig. 5 is elongated transversely as well as longitudinally. We cement the patch to the surface of the biscuit at the edge of the major diametric plane thereof as illustrated in Fig. 5, the inwardly projecting portion of the valve ferrule bending inwardly the wall of the body behind it. We then place this distorted biscuit with the major diametric plane vertical in the vulcanizing mold 60 illustrated in Fig. 5 with a pin 55 which has been screwed into the valve ferrule occupying an opening 61 at the base of one of the cavities of the vulcanizing mold.

As shown in Fig. 5 the vulcanizing mold has cavities transversely semi-circular. By reason of the flattened sides of the biscuit, and the peculiar method of placing it in the vulcanizing mold, the latter may be closed without danger of pinching the biscuit. The members of the vulcanizing mold are held together by suitable means (as for instance the wedge members 68 engaging tapered ribs 69 on the molds) the mold is heated and some heat expanding substance, which was placed within the article before its complete formation, causes an internal pressure during vulcanization.

The interior surface of the cavities of the vulcanizing mold is suitably roughened as shown at 62 to give the ball the leatherlike surface desired. Adjacent the opening 61 the inner surface is provided with ribs and grooves complementary to the grooves and ribs in the finished article as shown in Fig. 1, whereby the vulcanized ball has the appearance of being provided with laces through a reinforcing pad as usual with a leather ball. The internal pressure causes the pad 50 carrying the valve to become firmly embedded in the rubber wall B as shown in Fig. 8. The result is that the outer surface of this patch becomes substantially flush with the outer surface of the ball. This view indicates at 10 suitable transverse ribs on the rubber article indicative of laces. We have shown some of these ribs as being formed of the patch and others of the wall proper. When the article is finally vulcanized the material of the biscuit is bent inwardly around and behind the valve ferrule forming a reinforcing 20 of rubber as indicated in Figs. 8 and 9.

These cavities are longitudinal approximately semi-elliptical and somewhat more elongated than the major axis of the finished ball, so that as vulcanized the longitudinal contour of the ball would be of the very prolate form indicated by the line 75 on Fig. 1, but on release from the mold, the internal pressure tends to make the ball more spherical and brings it into the desired shape shown in full lines in Fig. 1. After the ball has been removed from the mold, the peg 55 screwed out of the valve ferrule, the rubber across the inner face of the ferrule centrally punctured through the ferrule and the gasket and plug applied in the ferrule as indicated in Fig. 9.

Convenient means for inflating through such a valve as described is to use a tapered nipple 28 adapted to wedge tightly into the inner surface of the plug 25 whereby the plug may be turned. To facilitate this turning, we may provide knurled head 29 on the plug 28. This plug is hollow and air is led therethrough from a tube 30 which may be connected with a pump. After inflation to the proper pressure, rotation of the nipple and plug sets the plug against the gasket 24 and seals the opening.

From the foregoing description, it will be seen that we have provided a simple and effective method for the manufacture of a football of rubber. The selection of the material for rubber is such that it is resilient and yet tough, capable of standing abuse when in use, while the finished article has the very close resemblance to a leather football, provided with the usual rubber bladder. Coloring the rubber substantially that of tan pigskin gives an accurate and pleasing imitation of a football.

Having described our invention, we claim:

1. The method of making foot balls comprising forming a biscuit of rubber and applying to the same an external patch with a valve casing clamped to the inner and outer face of the patch, and vulcanizing the article as a unit.

2. The method of making footballs comprising forming a biscuit in the form of a flattened ellipsoid, securing a valve casing at the end of the major transverse diameter of the ellipsoid and vulcanizing the article with such valve casing carried by one of the two mold members.

3. The method of making footballs comprising seating the stock by suction in comparatively shallow mold cavities, joining such seated stock whereby a flattened biscuit is obtained, securing a valve casing to one of the comparatively narrow edges of the biscuit, placing the body with the valve casing in a vulcanizing mold the cavities of which are transversely circular in contour, one of which is provided with means for positioning the valve and with depressions to form representations of laces adjacent such valve.

4. The method of making footballs comprising forming a biscuit of raw rubber, applying to the same an external patch of raw rubber carrying a valve casing locked to the inner face of the patch, and vulcanizing the article and patch as a unit.

5. The method of making footballs comprising forming a hollow biscuit with heat expanding substance within it, sticking to the exterior of the biscuit a patch carrying a valve casing which is provided with a projection on the inner side of the patch, and vulcanizing the biscuit and patch by internal pressure against a wall overlying the biscuit and patch to cause the patch to be substantially countersunk within the wall of the body.

6. The method of making footballs and similar articles comprising forming a hollow biscuit, forming a patch, extending a valve ferrule through the patch, applying a washer to the ferrule on the other side of the patch, sticking the patch to the exterior of the biscuit, and vulcanizing the biscuit and patch together.

7. The method of making footballs and similar articles consisting of forming a hollow biscuit of raw rubber, taking a patch of raw rubber, making an opening through it, extending through the opening the threaded body of a flanged ferrule, securing a washer onto the projecting portion of the ferrule to clamp the patch between the washer and flange, placing such patch with the inner end of the ferrule against the exterior of the biscuit, vulcanizing the parts with internal pressure against a continuous wall to cause the patch to become countersunk in the body of the ball, and thereafter cutting an opening through the body of the ball opposite the inner end of the ferrule.

8. The method of making hollow rubber articles comprising forming a biscuit as a closed body flattened transversely, securing to one of the comparatively narrow edges of said body a patch carrying a valve casing, placing the body and patch in a vulcanizing mold with the sides of the body out of contact with the walls of the mold adjacent the meeting edges thereof, and vulcanizing the article in such mold with an internal pressure caused by heat acting on a heat expanding substance previously placed within the body.

9. The method of making footballs comprising forming a biscuit as a hollow flattened ellipsoid, securing to the exterior of the biscuit at the end of the major transverse diameter of the biscuit a patch carrying a valve, and vulcanizing the article with internal pressure to cause the patch to be countersunk into the wall of the body.

10. As a new article of manufacture, a football having a valve carried by an external patch embedded within the wall of the body, and a locking member carried by the valve between the patch and the body wall behind it.

11. A football comprising a hollow body with a thick and impervious wall, a patch vulcanized to the exterior of the body, and a valve having a flanged threaded ferrule extending through the patch with the flange adjacent one face thereof, and a nut screwing onto the ferrule adjacent the other face of the patch, whereby lateral projections are provided on the outer face of the patch and between the patch and the body wall behind it.

In testimony whereof, we hereunto affix our signatures.

FRED THOMAS ROBERTS.
WILLIAM EUGENE ROBERTS.